United States Patent [19]
Choi

[11] Patent Number: 5,541,779
[45] Date of Patent: Jul. 30, 1996

[54] OPTICAL IMAGING SYSTEM

[75] Inventor: Hwan-Moon Choi, Seoul, Rep. of Korea

[73] Assignee: Daewoo Electronics Co., Ltd., Seoul, Rep. of Korea

[21] Appl. No.: 341,864

[22] Filed: Nov. 15, 1994

[30] Foreign Application Priority Data

Nov. 17, 1993 [KR] Rep. of Korea ............... 93-24553
Nov. 17, 1993 [KR] Rep. of Korea ............... 93-24554

[51] Int. Cl.⁶ ............... H04N 9/31; G02B 5/18; G02B 5/20; G02B 5/08
[52] U.S. Cl. ............... 359/885; 359/887; 359/888; 359/723; 359/558
[58] Field of Search ............... 359/885, 887, 359/558, 567, 568, 381, 379, 374, 448, 454, 600, 642, 646, 649, 664, 810, 723, 724, 585; 354/100

[56] References Cited

U.S. PATENT DOCUMENTS

| | | | |
|---|---|---|---|
| 2,207,411 | 7/1940 | Pierce | 354/100 |
| 3,097,255 | 7/1963 | Farquhar et al. | 359/724 |
| 4,030,817 | 6/1977 | Westell | 359/888 |
| 4,035,062 | 7/1977 | Fletcher et al. | 359/558 |
| 4,454,535 | 6/1984 | Machida | 359/723 |
| 4,906,081 | 3/1990 | Yashuda | 359/723 |
| 5,013,133 | 5/1991 | Buralli et al. | 359/558 |

FOREIGN PATENT DOCUMENTS

| | | | |
|---|---|---|---|
| 2312790 | 12/1976 | France | G02B 5/20 |
| 0316803 | 12/1988 | Japan | G02S 5/20 |

OTHER PUBLICATIONS

Xerox Disclosure Journal, Kenneth Altfalher and Jamer Law. vol. 4, No. 4, Jul./Aug. 1979.

*Primary Examiner*—Paul M. Dzierzynski
*Assistant Examiner*—Mohammad Y. Sikder
*Attorney, Agent, or Firm*—Oliff & Berridge

[57] ABSTRACT

An optical imaging system having a simple optical shading filter for reducing various aberrations is disclosed. The optical imaging system includes one or more lenses, a stop installed between the lenses, and an optical shading filter for reducing the extra axial aberrations. The optical shading filter is an gradual optical shading filter having a transmittance which deceases cuing toward the peripheral portions. The optical imaging system is simple in its structure, and is effective in its function. Further, the manufacturing is easy, and the manufacturing cost is low.

9 Claims, 6 Drawing Sheets

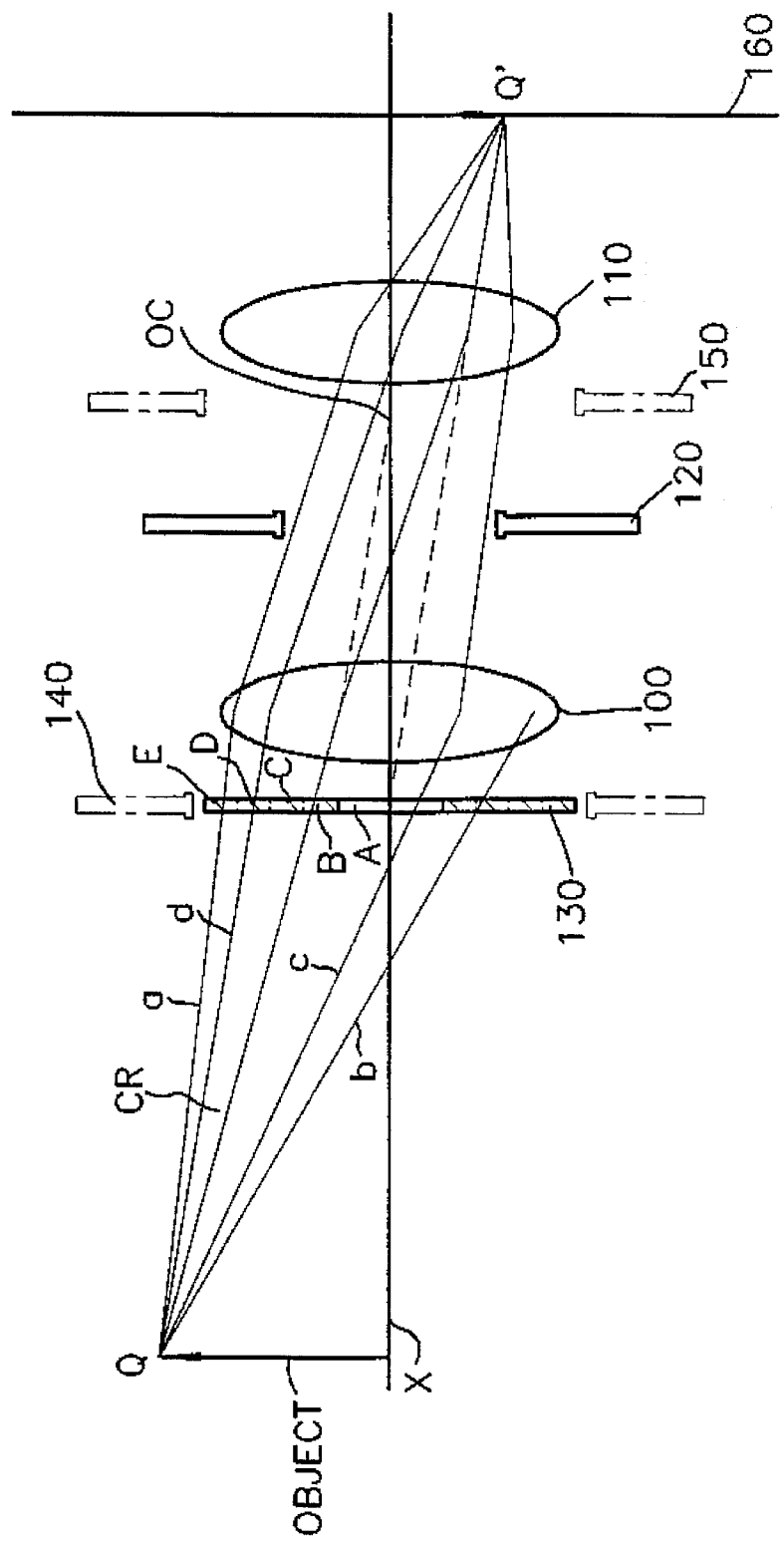

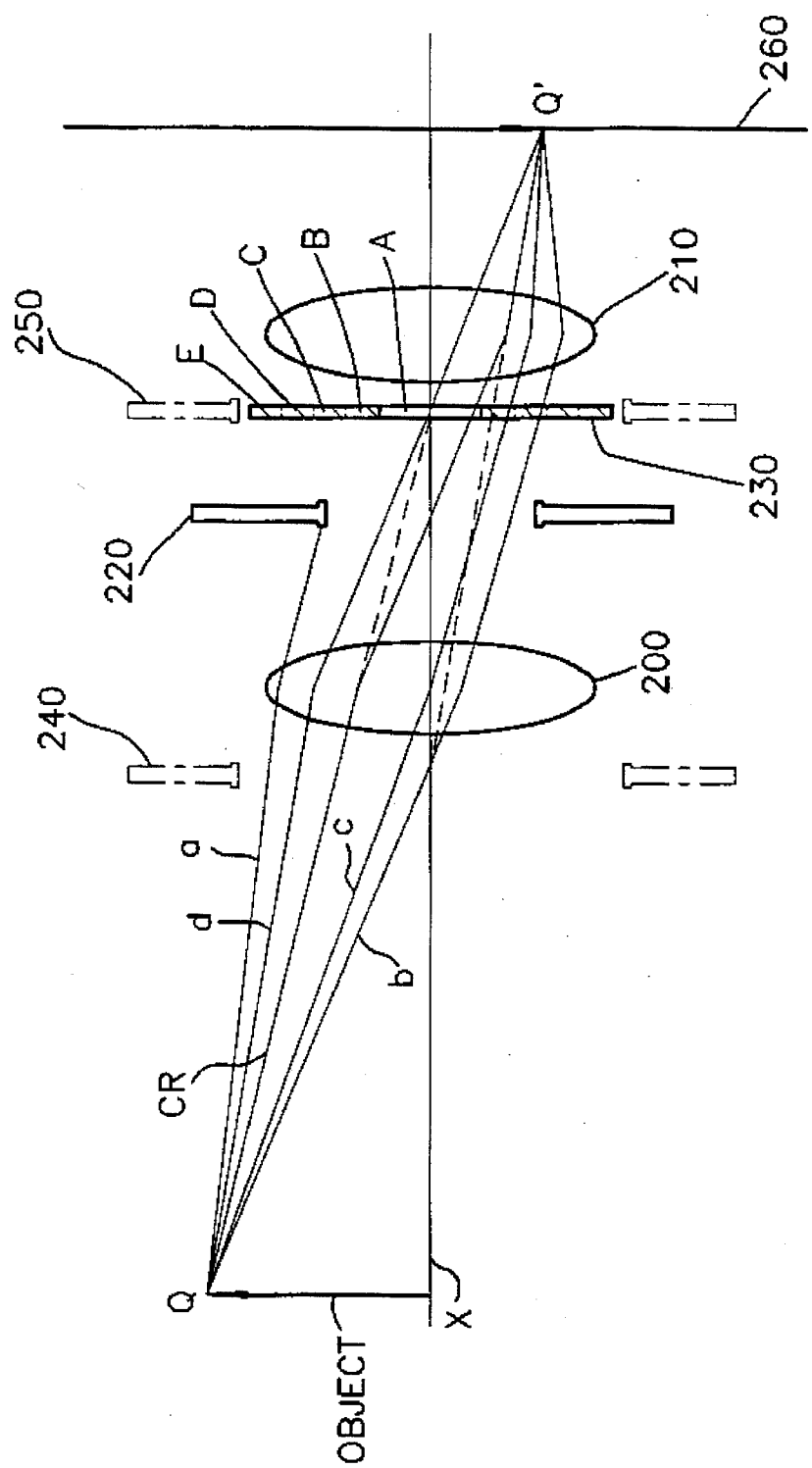

OPTICAL IMAGING SYSTEM

BACKGROUND OF THE INVENTION

1. Field of the Invention

The present invention relates to an optical imaging system. More particularly, the present invention relates to an optical imaging system in which extra axial aberrations are minimized.

2. Description of the Prior Art

It is difficult to completely eliminate aberrations in all kinds of optical systems. If a particular aberration is to be removed, another kind of aberration is increased, and therefore, it is difficult to completely eliminate aberrations. In the conventional techniques, most methods which are attempted to eliminate aberrations make efforts to vary the curvature of lenses or to combine various lenses, thereby trying to minimize them. As result of such efforts, the non-spherical lenses and the zoom lenses were developed.

As a method which is different from the above described ones, U.S. Pat. No. 5,013,133 discloses a technique in which a diffractive optical imaging lens system is used for reducing the aberrations in a optical imaging lens system. FIG. 1 is a schematic view showing the conventional diffractive optical imaging lens system which is disclosed in the above patent. This conventional diffractive optical imaging lens system includes a zone plate type of a diffractive lens 10 and by positioning an aperture stop 12, the aberration is reduced in the image which is formed by the diffractive optical lens.

The operation and effect of the method of the above patent will be described below in brief terms.

Diffractive lens 10 consists of a central circular zone having a radius r1, and annular zones formed between radii r1, r2 and r3. Thus diffractive lens 10 provides diffractive zones which are disposed in a parallel relationship, and therefore, diffractive lens 10 has a anamorphic configuration. The optical axis of the diffractive lens passes in the direction of the longest conjugate distance through aperture stop 12 which is disposed separately from the diffractive lens. The direction should desirably lie toward the front focal plane of diffractive lens 10 which is remotely separated from an object. In the case of a paraxial ray in which the object is separated remotely (in other words, at an infinite distance), coma, astigmatism, distortions and field curvatures are reduced to zero. That is, as is described in the above patent, the field aberration of coma, astigmatism and field curvature becomes zero for an object separated in an infinite distance. Further, aperture stop 12 is provided with a phase corrector plate 14 (for example, aspheric corrector plate) so as to correct the spherical aberration.

The optical rays which are disposed outwardly from the paraxial rays generate a phase difference with the paraxial rays when passing through diffractive lens 10. Therefore, in order to correct this, phase corrector plate 14 is installed on aperture stop 12. Phase corrector plate 14 is an aspheric corrector plate of Schmidt camera type. Phase corrector plate 14 is properly designed for correcting the spherical aberration by applying the usual design technique. In the case where the spherical aberration is corrected by using phase correcting plate 14, the incoming optical rays spaced from the paraxial rays generate a phase difference relative to the paraxial rays, but the phase difference disappears when passing through diffractive lens 10.

On the other hand, in the case of finite conjugate rays, sufficient zone intervals and an adjustment of the distance of aperture stop 12 are provided, so that a comaless petzval curvature and a finite conjugate can be obtained.

When eliminating the aberration based on the conventional method, a fixed parameter has to be satisfied and therefore, there is a limit in designing the optical system. Further, curved surfaces having different curvatures exist on one lens, and therefore, the manufacturing of the lens becomes difficult. The most important of all, it is applicable only to a monochrome system, and therefore, it can be applied to only the laser scanner and the like. Therefore, there remains the need for an optical system which is widely applicable and applicable to the general optical fields.

SUMMARY OF THE INVENTION

The present invention is intended to overcome the above described disadvantages of the conventional techniques.

Therefore, it is an object of the present invention to provide an optical imaging system in which extra axial aberrations including other aberrations are reduced.

It is another object of the present invention to provide an optical imaging system in which a simple gradual transmittance filter is installed, thereby forming a simple optical imaging system.

In achieving the above objects, the optical imaging system according to the present invention includes:

a first lens facing toward an object and a second lens facing toward a focal plane;

a stop installed between said first and second lenses; and an optical shading filter for reducing an extra axial aberration which is included in extra axial rays surrounding central rays.

The optical shading filter is preferably an gradual optical shading filter of features such that its optical transmittance becomes gradually low coming toward peripheral portions from a central portion.

According to one embodiment of the present invention, the gradual optical shading filter has a circular shape.

According to another embodiment of the present invention, the gradual optical shading filter comprises two separate semi-circular shapes.

According to still another embodiment of the present invention, the gradual optical shading filter can be attached directly on a surface of the lens.

The optical imaging system according to the present invention is simple in its structure, and therefore, the manufacturing is easy, with the result that the manufacturing cost is saved. Further, modifications can be easily added in accordance with the needed level of the elimination of the aberrations. Further, a large number of lenses is not required for eliminating aberrations, and it is possible to form an optical imaging system in which its effect is excellent. Further, the adjustment of the gradual optical shading filter is possible through the adjustment of a stop.

BRIEF DESCRIPTION

The above object and other advantages of the present invention will become more apparent by describing in detail the preferred embodiment of the present invention with reference to the attached drawings in which:

FIG. 3 is a schematic view showing a first embodiment of the present invention;

FIG. 4 is a schematic view showing a second embodiment of the present invention.

DESCRIPTION OF THE PREFERRED EMBODIMENT

The optical imaging system according to the present invention will be described referring to the attached drawings.

Embodiment 1

Figure 1:
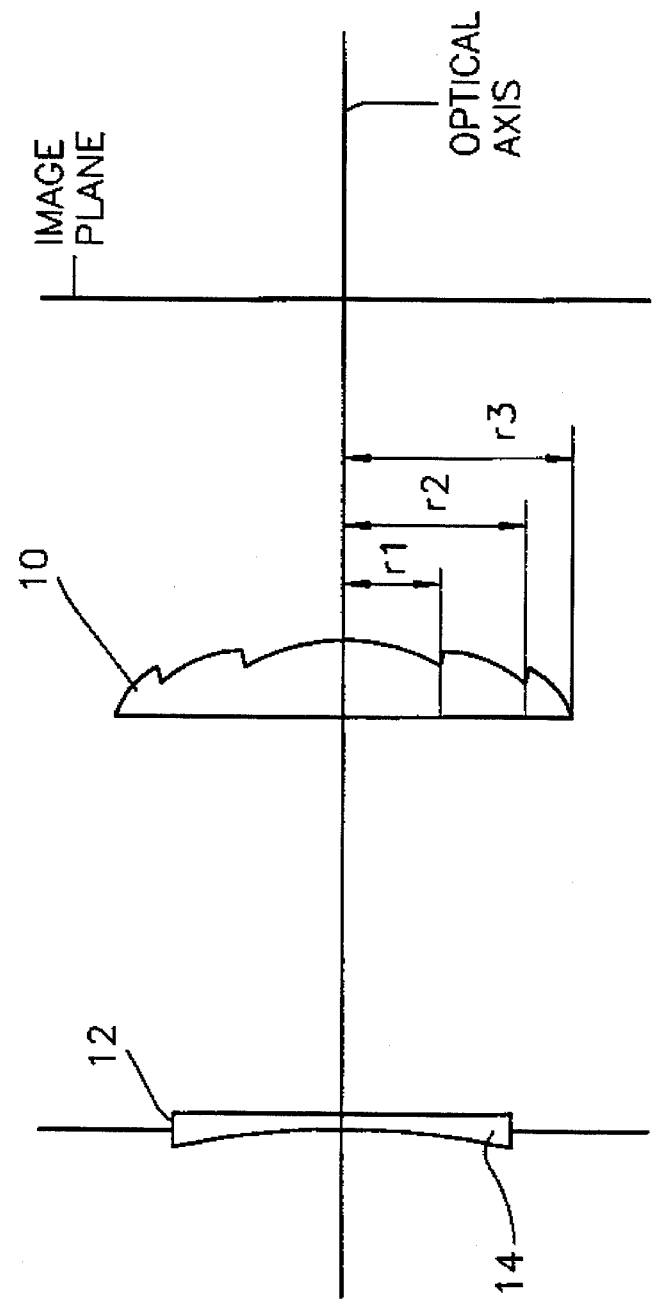
FIG. 1 is a schematic view showing a conventional optical imaging system using a diffractive lens for eliminating aberrations.
Figure 2A:
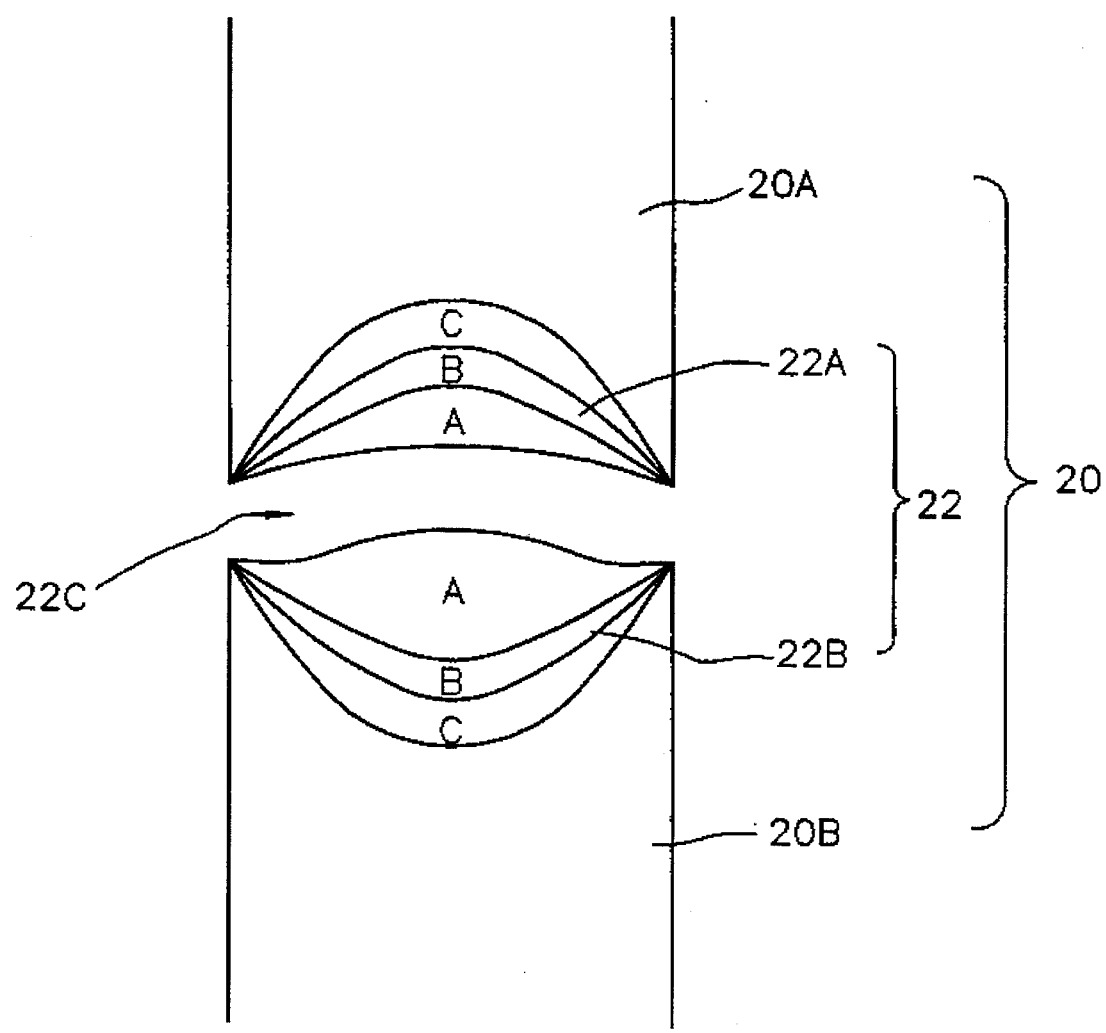
FIGS. 2A and 2B are plan views showing a gradual optical shading filters used on the optical imaging system of the present invention for reducing aberrations.
Figure 2B:
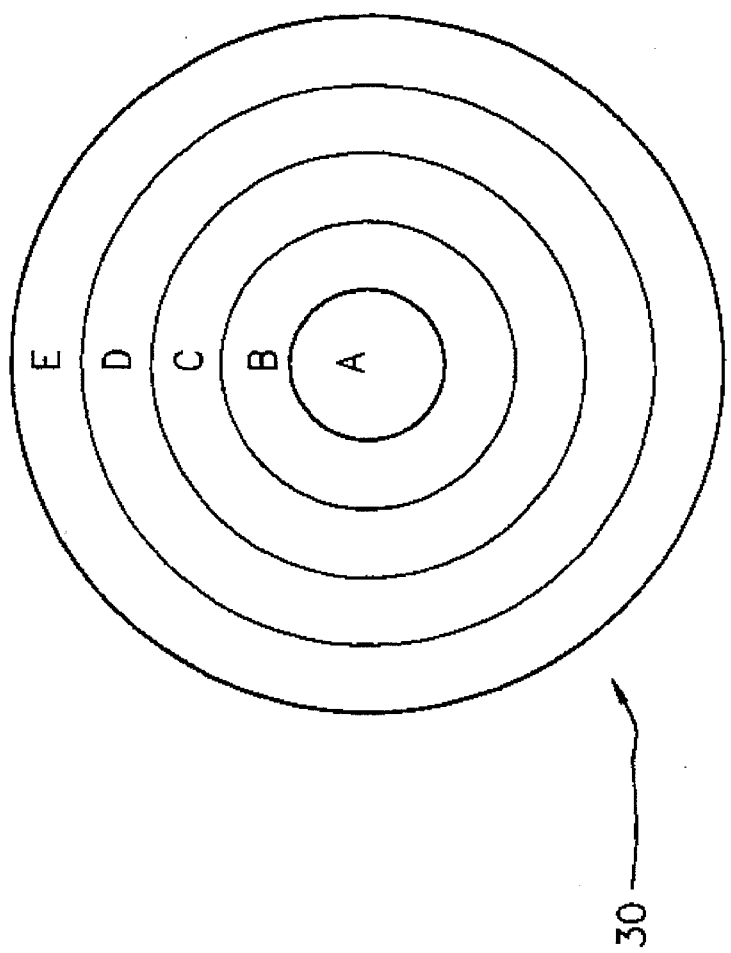

FIGS. 2A and 2B are plan views showing an gradual optical shading filter used on the optical imaging system of the present invention for reducing aberrations.

As shown in FIG. 2A, the optical imaging system of the present invention includes an gradual optical shading filter 22 which includes two separate semi-circular members 22A and 22B. Semi-circular optical shading members 22A and 22B includes a divided circle which is divided into two arc portions each of which starts at one end of the diameter of the circle and ends at the other end of the diameter of the circle. Optical shading members 22A and 22B includes regions A, B and C, and are provided with a transmittance which decreases coming toward the peripheral portions. For example, the region A has a transmittance of 70 to 90%, the region B has a transmittance of 50 to 70%, and the region C has a transmittance of 20 to 50%. The dividing of the gradual optical shading filter into the three regions is merely an example, and the optical shading filter may be divided into more regions. The gradual optical shading filter can be attached to both ends 20A and 20B of a stop 20. Therefore, depending on the adjustment of stop 20, an opening 22C of the gradual optical shading filter can be varied.

An gradual optical shading filter 30 shown in FIG. 2B is a modification of the gradual optical shading filter of FIG. 2A. As shown in the drawing, gradual optical shading filter 30 which has a disc-shaped is radially divided, so that it would consist of a plurality of annular portions having different radii. That is, the gradual optical shading filter 30 consists of regions A, B, C, D and E in which the transmittance is decreased coming toward the peripheral portions from central portion of gradual optical shading filter 30. For example, the region A has a transmittance of 100%, while the regions B, C, D and E have transmittances of 80%, 60%, 40%, and 20% respectively.

The above described optical shading filter can have many other modified structures.

FIG. 3 illustrates a first embodiment of the present invention in which gradual optical shading filters 22 and 30 can be used. In the drawing, circular gradual optical shading filter 30 is used, but also semi-circular gradual optical shading filter 22 may be used. As shown in FIG. 3, optical rays start from one point of an object, and these optical rays includes central optical rays CR and extra axial rays a, b, c, d and so on. A first lens 100 and a second lens 110 are installed along an axis X, while a stop 120 is installed between first and second lenses 100 and 110. Then an image Q' of an object is formed at a focal plane 160 of second lens 110.

In FIG. 3, reference number 140 indicates an exit pupil as a imaginary image of the stop 120, which can be observed through second lens 110. Reference number 150 indicates an entrance pupil as a imaginary image of stop 120, which can be observed through first lens 100. In the present embodiment, gradual optical shading filter 130 is installed at the position of exit pupil 140. Generally entrance pupil 150 and exit pupil 140 look magnified compared with the actual opened aperture of stop 120.

In the present embodiment of the optical imaging system according to the present invention, the optical rays which start from a point Q' of an object which lies above the optical axis X include central rays CR and a plurality of extra axial rays a, b, c, d and so on, which surround the central rays OR. The central rays refer to the optical rays which pass through the opening center OC of entrance pupil 150. First, the central rays CR which have started from a point Q of an object pass through entrance pupil 150 and stop 120, and further pass through exit pupil 140 to ultimately arrive at focal plane 160.

Under this condition, the central rays pass through a high transmittance region B of the gradual optical shading filter which is installed at exit pupil 140. (As can be seen in FIG. 3, at the same time, the central rays CR pass through exit pupil 140.

They further pass through first lens 100, stop 120, entrance pupil 150 and second lens 110 to ultimately arrive at focal plane 160.

On the other hand, the extra axial rays a, b, c, d and so on which surround the central rays CR arrive at focal plane 160 by passing through a path different from that of the central rays CR. For example, the first extra axial rays a start from a point of an object to pass through the region E of gradual optical shading filter 130, which has a transmittance of about 20%. The first extra axial rays a which have passed through a portion of gradual optical shading filter 130 pass through first lens 100, stop 120, entrance pupil 150 and second lens 110 to ultimately arrive at the image Q' of the object which lies on focal plane 160 like the central rays CR.

The second extra axial ray b passes through the low transmittance region C of gradual optical shading filter 130, but further does not arrive at the image Q' of the object which lies at focal plane 160 by being shielded by the stop 120.

However, unlike the central rays CR, the extra axial rays a, b, c, d and so on have large aberrations, but if these extra axial rays do not pass through gradual optical shading filter 130 to arrive at focal plane 160, it will degrade the quality of the image of the object. However, according to the present invention as described above, the extra axial rays which have a large aberration pass through the portion of the gradual optical shading filter which has a low optical transmittance (about 20% in the present embodiment), so that about 20% of the rays would pass through. Consequently, these extra axial rays contribute less to the image formation, and therefore, the degradation of the quality of the image due to the aberration is greatly reduced.

Embodiment 2

FIG. 4 is a schematic view showing a second embodiment of the present invention. In the present embodiment as shown in FIG. 4, an gradual optical shading filter 230 is installed at the position of an entrance pupil 250, i.e., at the front of a second lens 210. Therefore, an arrangement is made in the order of an object, an exit pupil 240, a first lens 200, a stop 220, gradual optical shading filter 230 (entrance pupil 250), second lens 210 and a focal plane 260 along an optical axis X.

Entrance pupil 250 and exit pupil 240 refer to the imaginary image of stop 220 as observed from the focal plane 260 into lenses 200 and 210. Further in this embodiment unlike Embodiment 1, the central rays CR and the extra axial rays a, b, c, d and so on do not undergo partial shadings until they reach gradual optical shading filter 230. However, upon arriving at gradual optical shading filter 230 which is installed at the position of the entrance pupil, the central rays CR and the extra axial rays a, b, c, d and so on pass respectively through different regions of gradual optical shading filter 230.

For example, as shown in FIG. 4, the first extra axial rays a cannot contribute to forming an image by being, shielded by stop 220. Further, the second extra axial rays b are low in their contribution to the image formation by passing through the region C of gradual optical shading filter 230, which has a low optical transmittance.

However, the central rays CR pass through a center of entrance pupil 250, and therefore, they pass through the aperture A of gradual optical shading filter 230. As a result, the optical rays which most contribute to the image formation are the central rays CR.

Embodiment 3

In the above described first and second embodiments, the gradual optical shading filter is separate from the lens, but in the present embodiment, an gradual optical shading filter 330 is provided in the form of a film, so that it can be used attached onto a second lens 310.

Figure 5:
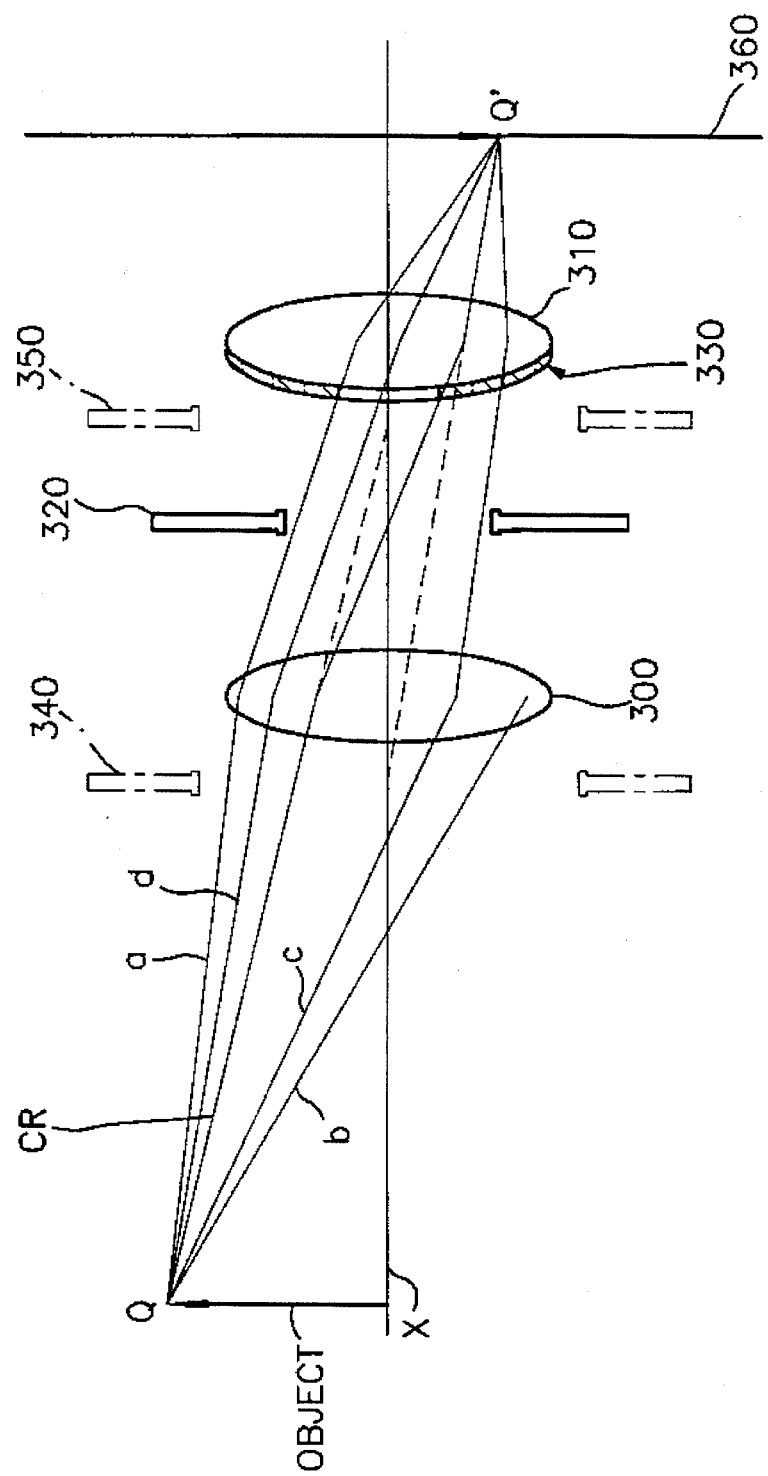
FIG. 5 is a schematic view showing a third embodiment of the present invention.

FIG. 5 is a schematic view showing a third embodiment of the present invention. In the present embodiment, an arrangement is made in the order of a point Q of an object, an exit pupil 340, a first lens 300, a stop 320, an entrance pupil 350, second lens 310 with gradual optical shading film 330 attached, and a focal plane 360 along the optical axis x of first and second lenses 300 and 310.

In the present embodiment, unlike the first and second embodiments, the gradual optical shading film is not installed at the position of the exit pupil or the entrance pupil. In other words, gradual optical shading film 330 is attached on the surface of second lens 310 on its side nearer to the object. Therefore, gradual optical shading film 330 exists between entrance pupil 350 and second lens 310.

Therefore, the central rays CR and the extra axial rays a, b, c, d and so on are refracted by first lens 300, and they are partly shielded by or pass through entrance pupil 350, stop 320 and exit pupil 340. The central rays CR and the extra axial rays which have not been shielded by entrance pupil 350, stop 320 and exit pupil 340 reach the film type gradual optical shading filter 330. The rays which have arrived at gradual optical shading filter 330 function as follows as in the first and second embodiments. That is, the central rays CR contribute greatly to forming an image, because a large amount of them pass through gradual optical shading filter 330. The extra axial rays a,b,c,d, and so on which surround the central rays CR make relatively small contributions to the image formation, because small amount of them pass through gradual optical shading filter 330. Thus the shielded rays are mostly those having a large aberration, and therefore, a sufficient amount of optical rays can be secured for the image formation. Consequently, a bright and clear picture can be obtained.

According to the present invention as described above, a simple gradual optical shading filter is provided, with the result that a significant reduction of aberration can be achieved. The extra axial aberrations such as coma, astigmatism, spherical aberration can be reduced without using the conventional complicated precise diffractive lens. Therefore, the overall optical imaging system is simplified, and the number of the components is reduced, with the result that the manufacturing cost is saved. If the semi-circular gradual optical shading filter is used, it can be attached to the stop, so that the optical shading filter can be adjusted in an easy manner along with the stop. Further, in the case of the extra axial rays which have a large aberration, only a small amount of optical rays pass through the optical shading filter (about 20% in the embodiments of the present invention), and therefore, they contribute less to the image formation. Therefore the rays which contribute to the image formation to the greatest degree are the central rays. Further, the shielded rays are mostly the extra axial rays having a large aberration, and therefore, a sufficient amount of optical rays can be ensured for the image formation. Consequently, a bright and clear picture can be obtained.

In the above, the present invention was described based on the specific embodiments, but it should be apparent to those ordinarily skilled in the art that various modifications and changes can be added without departing from the scope of the present invention which is only limited by the appended claims.

What is claimed is:

1. An optical imaging system comprising:
    a first lens facing toward an object and a second lens facing toward a focal plane;
    stopping means for partially stopping optical rays passing therethrough for forming an image, said optical rays having central optical rays which substantially contribute to the image formation and extra axial rays which generate an extra axial aberration and surround the central optical rays, said stopping means being installed between said first and second lenses; and
    an optical shading filter for partially shading the optical rays passing therethrough, said optical shading filter being divided into a central portion through which the central rays pass and a plurality of regions surrounding the central portion, the central portion and the regions having different optical transmittances which decrease coming toward outermost peripheral portions from the central portion, so that the central rays are transmitted to contribute to the image formation and outer extra axial rays are less transmitted less to contribute to the image formation, said optical shading filter reducing an extra axial aberration which is generated by said extra axial rays surrounding said central rays,
    wherein said optical shading filter comprises two separate semi-circular parts, each of the semi-circular parts being divided into a plurality of the regions by arcs which start at a first end of a diameter of said semi-circular part and end at a second end of the diameter.

2. The optical imaging system as claimed in claim 1, wherein said optical shading filter is disc-shaped, and is divided into a plurality of annular portions having different radii.

3. The optical imaging system as claimed in claim 1, wherein said optical shading filter is positioned at an exit pupil for reducing extra axial aberrations.

4. The optical imaging system as claimed in claim 1, wherein said optical shading filter is positioned at an entrance pupil for reducing extra axial aberrations.

5. The optical imaging system as claimed in claim 1, wherein said optical shading filter is a film type filter formed on a surface of said second lens for reducing extra axial aberrations.

6. The optical imaging system as claimed in claim 3, said optical shading filter comprises two separate semi-circular parts, each of the semi-circular parts being divided into the regions by arcs which start at a first end of a diameter of said semi-circular part and end at a second end of the diameter.

7. The optical imaging system as claimed in claim 3, wherein said optical shading filter is disc-shaped, and is divided into a plurality of annular portions having different radii.

8. The optical imaging system as claimed in claim 4, wherein said optical shading filter comprises two separate semi-circular parts, each of the semi-circular parts being divided into the regions by arcs which start at a first end of a diameter of said semi-circular part and end at a second end of the diameter.

9. The optical imaging system as claimed in claim 4, wherein said optical shading filter is disc-shaped, and is divided into a plurality of annular portions having different radii.

* * * * *